US008417090B2

(12) United States Patent
Fleming

(10) Patent No.: US 8,417,090 B2
(45) Date of Patent: Apr. 9, 2013

(54) SYSTEM AND METHOD FOR MANAGEMENT OF SURVEILLANCE DEVICES AND SURVEILLANCE FOOTAGE

(76) Inventor: Matthew Joseph Fleming, Las Vegas, NV (US)

( * ) Notice: Subject to any disclaimer, the term of this patent is extended or adjusted under 35 U.S.C. 154(b) by 232 days.

(21) Appl. No.: 12/862,353

(22) Filed: Aug. 24, 2010

(65) Prior Publication Data

US 2011/0299835 A1    Dec. 8, 2011

Related U.S. Application Data

(60) Provisional application No. 61/351,608, filed on Jun. 4, 2010.

(51) Int. Cl.
*H04N 5/77* (2006.01)
*H04N 5/765* (2006.01)
(52) U.S. Cl. ........................ 386/226; 386/232
(58) Field of Classification Search .................. 386/280, 386/226, 200, 223, 228, 229, 232
See application file for complete search history.

(56) References Cited

U.S. PATENT DOCUMENTS

| | | | |
|---|---|---|---|
| 6,778,085 B2 | 8/2004 | Faulkner et al. | |
| 6,798,344 B2 | 9/2004 | Faulkner et al. | |
| 7,158,026 B2 | 1/2007 | Feldkamp et al. | |
| 7,323,980 B2 | 1/2008 | Faulkner et al. | |
| 7,719,567 B2 | 5/2010 | Renkis | |
| 7,719,571 B2 | 5/2010 | Renkis | |
| 2002/0167590 A1 | 11/2002 | Naidoo et al. | |
| 2002/0186300 A1 | 12/2002 | Hudson | |
| 2003/0061344 A1 | 3/2003 | Monroe | |
| 2003/0061621 A1 | 3/2003 | Petty et al. | |
| 2003/0085998 A1 | 5/2003 | Ramirez-Diaz et al. | |
| 2003/0097586 A1 | 5/2003 | Mok | |
| 2003/0128113 A1 | 7/2003 | Chang et al. | |
| 2003/0137426 A1 | 7/2003 | Anthony et al. | |
| 2004/0004542 A1 | 1/2004 | Faulkner et al. | |
| 2004/0004543 A1 | 1/2004 | Faulkner et al. | |
| 2004/0085202 A1 | 5/2004 | Naidoo et al. | |
| 2004/0145657 A1 | 7/2004 | Yamamoto et al. | |
| 2004/0205823 A1 | 10/2004 | Tsai | |
| 2005/0068175 A1 | 3/2005 | Faulkner et al. | |
| 2005/0110634 A1 | 5/2005 | Salcedo et al. | |
| 2005/0132414 A1* | 6/2005 | Bentley et al. ................ 725/105 |
| 2005/0146606 A1 | 7/2005 | Karsenty et al. | |
| 2005/0174229 A1 | 8/2005 | Feldkamp et al. | |
| 2005/0237187 A1 | 10/2005 | Martin | |
| 2006/0072757 A1 | 4/2006 | Renkis | |
| 2006/0083305 A1 | 4/2006 | Dougherty et al. | |
| 2006/0156361 A1 | 7/2006 | Wang et al. | |
| 2006/0259933 A1* | 11/2006 | Fishel et al. .................. 725/105 |
| 2006/0279423 A1 | 12/2006 | Nazari | |
| 2007/0091176 A1 | 4/2007 | Shih et al. | |
| 2007/0182540 A1 | 8/2007 | Marman | |
| 2007/0271454 A1 | 11/2007 | Yen et al. | |

(Continued)

FOREIGN PATENT DOCUMENTS

WO    WO/03/026305    3/2003
WO    WO/2006/046234    5/2006

*Primary Examiner* — Robert Chevalier
(74) *Attorney, Agent, or Firm* — Triangle Patents PLLC

(57) ABSTRACT

A system or method of transmitting and receiving surveillance video and/or alarm data and converting proprietary video formats into a single, standardized format for viewing on a multiplicity of devices at the surveillance location by authorized emergency responders.

24 Claims, 5 Drawing Sheets

U.S. PATENT DOCUMENTS

| | | |
|---|---|---|
| 2009/0077167 A1 | 3/2009 | Baum et al. |
| 2009/0122144 A1* | 5/2009 | Latham et al. ............... 348/155 |
| 2009/0237504 A1 | 9/2009 | Renkis |
| 2010/0066559 A1 | 3/2010 | Judelson |
| 2010/0066835 A1 | 3/2010 | Colciago |
| 2010/0127850 A1 | 5/2010 | Poder |
| 2010/0128123 A1 | 5/2010 | DiPoala |
| 2010/0138911 A1 | 6/2010 | Lin et al. |

* cited by examiner

SYSTEM AND METHOD FOR MANAGEMENT OF SURVEILLANCE DEVICES AND SURVEILLANCE FOOTAGE

CROSS-REFERENCE TO RELATED APPLICATIONS

This non-provisional utility patent application claims the benefit of prior filed U.S. provisional application Ser. No. 61/351,608 filed Jun. 4, 2010, which is incorporated herein by reference in its entirety.

BACKGROUND OF THE INVENTION

1. Field of the Invention

The present invention relates to surveillance systems and methods for operating them.

2. Description of the Prior Art

Traditional Digital Video recorders use proprietary software for the purposes of remote viewing. When a large number of different DVR systems are to be managed/accessed, this creates a problem in that the end user is required to have the proprietary software installed for each of the DVR brands they wish to access. These video files can also be very large in size. The size of video can create a significant delay in their transmission over a network. To convert these video images into a standardized format can also require the use of a very powerful centralized server. If a user is charged with the task of maintaining a large number of different DVRs, a challenge arises in having to maintain lists of IP addresses, usernames and passwords, and location details for each of the installed DVR units.

In addition, there is currently a large disconnect between DVR owners and Law Enforcement agencies. Typically when an event occurs such as a robbery, it can be hours or days until surveillance footage of the act is available to law enforcement. This creates a significant delay in the identification and apprehension of suspects that are caught on camera. There can also be a significant delay between the time an alarm occurs and the time police are actually notified of the alarm. Law enforcement agencies also have the dangerous job of responding to burglar and panic alarms without having video or images of what waits for them inside of the establishment they are responding to.

There also exists a significant problem in false alarm rates; that is, law enforcement responding to panic and burglary alarms inadvertently triggered resulting in a police call and response. This creates a financial hardship for law enforcement agencies as these wasted resources are deployed in situations where they didn't have to be.

U.S. Pat. No. 6,778,085 & US Pub. No. 20040004543 with J. Faulkner as inventor for a security system and method with realtime imagery, describes a security/surveillance system that uses an image capturing device to reproduce realtime imagery and/or video along with a computer system and server linked to a network for transmitting realtime imagery to emergency response agencies.

U.S. Pat. No. 7,323,980 & US Pub. No. 20050068175 also with J. Faulkner as inventor for a security system and method with realtime imagery, describes a security/surveillance system that uses an image capturing device to reproduce realtime imagery and/or video along with a computer system and server linked to a network for performing processes as described above in U.S. Pat. No. 6,778,086/US Pub. No. 20040004543 with additional features such as generating and transmitting biometric analysis along with the structural attributes of the location and physical conditions of the location.

U.S. Pat. No. 6,798,344 & US Pub. No. 20040004542 also with J. Faulkner as inventor for a Security Alarm System and method with realtime streaming video, describes a security system that uses a video camera and an alarm sensor to reproduce, process and display realtime streaming video linked to a network for activation of emergency response agencies based on a user's password and displaying realtime video at the emergency response agency depending upon valid password entry.

U.S. Pat. No. 7,719,567 & US Pub. No. 20060072757 assigned to Smartvue Corporation for a wireless video surveillance system and method with emergency video access, describes a surveillance system that uses an image capturing device and a digital recorder to transmit/receive data to a third party, which are described as any form of emergency response units, an alarm sensor to reproduce, process and display realtime video linked to a network for transmitting/receiving/displaying live video stream or recorded video and generating video stream on command.

U.S. Pat. No. 7,719,571 & US Pub. No. 20090237504 also assigned to Smartvue Corporation for wireless video surveillance system and method with DVR-based querying describes a surveillance system that uses a wireless image capturing device (ICD) and a digital input recorder (DIR) to generate/transmit/receive data to a third party, which are described as any form of emergency response units.

US Pub. No. 20070182540 assigned to GE Security Incorporated for local verification systems and methods for security monitoring, describes a security monitoring system capable of image verification and/or detection with the use of an image capturing device such as a camera to generate/transmit data to a remote device and/or system; further describing the reproduction and transmission of visual image data along with audio/sound data, performing object recognition and background/foreground analysis, and generating an alarm based on verification and recognition data.

US Pub. No. 20060279423 with Soheil Nazari as inventor for a stand alone surveillance system, describes a surveillance system comprising DVRs, video cameras and self-generating power source capable of receiving/generating and transmitting video images via network.

US Pub. No. 20040205823 assigned to Chic Technology for a residential security system, describes a security system with WEB cameras, WEB Servers and DVRs for live surveillance via an established network transmitted through a PSTN and a computer system.

US Pub. No. 20030128113 assigned to Accton Technology Corporation for a network communication device security system and method using of the same, describes a security system that contains an image capturing device, digital video recorder, cameras and a network communication link device capable of process, receiving and transmitting video image data.

U.S. Pat. No. 7,158,026 & US Pub. No. 20050174229 assigned to Security Broadband Corp for a security system configured to provide video and/or audio information to public or private safety personnel at a call center or other fixed or mobile emergency assistance unit, describes a security/surveillance system that uses image capturing device and detection devices to reproduce near real-time video stream and audio data and server linked remotely to a network for transmitting near real-time video streams and audio information to server and workstation for processing and verification.

US Pub. No. 20050110634 with D. Salcedo as inventor for a portable security platform, describes a security system containing a camera device configured to generate and monitor video signals in combination with processing the alarm data for transmission to a PDA and/or the like.

US Pub. No. 20050146606 with Y. Karsenty as inventor for a real-time video queuing and display system, describes a monitoring system that processes the conditions of remote sites by generating an alert for emergency response unit correspondence.

US Pub. No. 20050237187 with S. Martin as inventor for a real-time security alert & connectivity system for real-time capable wireless cell phones and palm/hand-held wireless apparatus, describes a security surveillance system that provides electronic device users real-time viewing and data access of their home and/or property.

SUMMARY OF THE INVENTION

The present invention relates to surveillance methods. More particularly, the present invention relates to alarm data and surveillance video display, archiving and distribution.

DETAILED DESCRIPTION OF THE INVENTION

Figure 1:
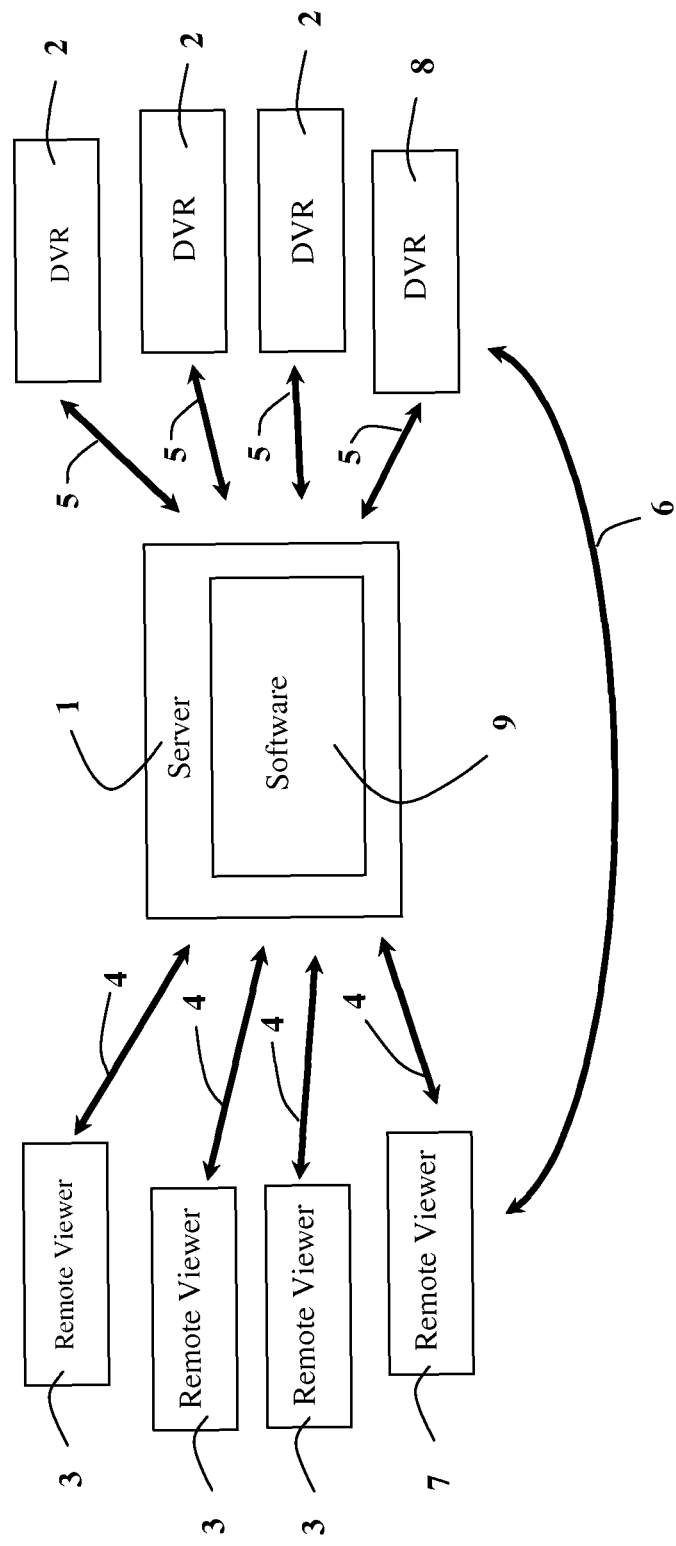
FIG. 1 is a chart describing the connection of Remote Viewer(s), DVR(s) and a central server.

Referring now to the drawings in general, the illustrations are for the purpose of describing a preferred embodiment of the invention and are not intended to limit the invention thereto.

The present invention advantageously creates a platform where multiple video types, created by a multiplicity of different Digital Video Recorders (DVRs) can be converted into a common format for viewing across multiple platforms. A problem exists today with many different DVR's requiring proprietary software or CODECs to be installed on a user's system to view video specific to a manufacturer's DVR. This presents a problem when managing a multiplicity of various DVR units from various manufacturers. To solve this problem, a remote viewer connects to a central server; the server then downloads the live images from these various DVR units; and the images are converted to a standard format and then presented back to the viewer as standard images or as a standardized video stream. Standard video formats currently include .flv, .mp4, .14v, .avi and .ogv. Video formats will undoubtedly change and future formats are within the scope of the invention. Alternatively, the standard image and video format are the most common or most prevalent formats for an area of operation. None of the prior art describes a combined system with DVR software processing along with the on-demand features of stored images or real-time images and live video streaming with image editing and cropping capabilities.

The invention allows end users to access a multiplicity of DVR video and audio, both live and recorded, by either a) converting video/audio into a standard format at the DVR itself; or b) converting the video/audio at a central server. Once the video/audio is converted, the video/audio is viewable by standard applications such as and including, but not limited to, Adobe Flash, Windows Media Player, Apple Computer Quick Time, RealNetworks RealVideo, and the like. The invention further allows central management and video alarm monitoring from a central server, integrating access to a multiplicity of DVR's that can be located anywhere in the world. With a hosted surveillance solution, a subscription based fee-structure can be implemented without requiring a large up-front capital investment in server equipment by central alarm monitoring stations and law enforcement agencies.

The invention further takes advantage of excess computing power that exists on both PC and standalone DVRs themselves. By converting and processing the video on-site, in the DVR itself, rather than converting and processing the video at the central server, the invention allows the use of this excess remote computing power to reduce server overhead and speed up transmission of video clips over the network medium. The present invention further includes the use of mesh computing, wherein DVRs in the vicinity of the DVR that initiated the alarm can assist the alarm-initiating DVR in the processing of video clips and in distributing the processed video clips to responders. The use of a mesh network advantageously provides for a resilient alarm system that can provide for the distribution of the video clips even if the connection with the server has failed. Thus, all embodiments described herein using a server can be substituted with a mesh network of DVRs wherein the mesh network performs the functions of the server.

The invention further makes use of newer technology being implemented by law enforcement and in law enforcement vehicles across the country. By combining the conversion of surveillance video to a standard format and a central server management platform, access to both pre-recorded and live video becomes available to law enforcement departments, at both the dispatch center and within law enforcement vehicles responding to incidents. This allows for first responders to pull images and video from the location as they approach, thereby having an updated, clear video overview of the situation they are responding to. Otherwise, as is the present state of the art, emergency responders have to approach a location blind—having no idea what is waiting for them once they enter a building or location. The invention similarly provides for volunteers and other local personnel to pull images and video at the location to scan for aberrant activity during normal, non-emergency states. The invention further allows the use of standard web-browsing applications for both viewing of live and pre-recorded video/audio without requiring the installation of any software on a remote viewing device. This greatly simplifies access to DVR video/audio.

Thus, the present invention processes and converts captured or live images or video with the DVR and neighboring DVRs. This processing includes using facial recognition/detection capabilities located on the server/DVRs, using image editing/cropping for image clarification, and using time-slicing and/or interval counting (alarm event timer). Further, the present invention permits on-demand /on-command features to allow for immediate viewing by requestors, thus permitting emergency response personnel to pull images and video, rather than strictly push them to them. The on-demand features also provide for community policing by volunteers or other local personnel to pull images and video to scan for aberrant activity during normal states. Emergency response personnel and community policing volunteers are to be understood as persons preauthorized to access the surveillance video. They are preauthorized to view the specific cameras that are within their access privilege, and typically this relates to their jurisdiction or geographic area.

FIG. 1 is a block diagram illustrating the overview of an embodiment of the present invention and connected devices. The example embodiment consists of a server 1 running software 9, a plurality of DVR's's installed at remote locations 2 and 8, a plurality of remote viewers 3 and 7 running on computers, connected together via network mediums 4 and 5. Network mediums 4 and 5 consist of a connection such as an Internet connection. For the purposes of this description, DVR 8 and Remote Viewer 7 have been given unique item numbers to illustrate the relationship of specific remote units to specific remote DVRs in the event of an alarm or when instructions are prepared for a specific DVR connected to server 1. Server 1 can consist of a single server or multiple servers connected together. Images and videos are stored in a storage device (not shown) that emergency responders can access via the remote viewers running on computers. Preferably, this is stored on the DVR (as a storage device), on the server(s), and/or separate storage device, as appropriate.

Figure 2:
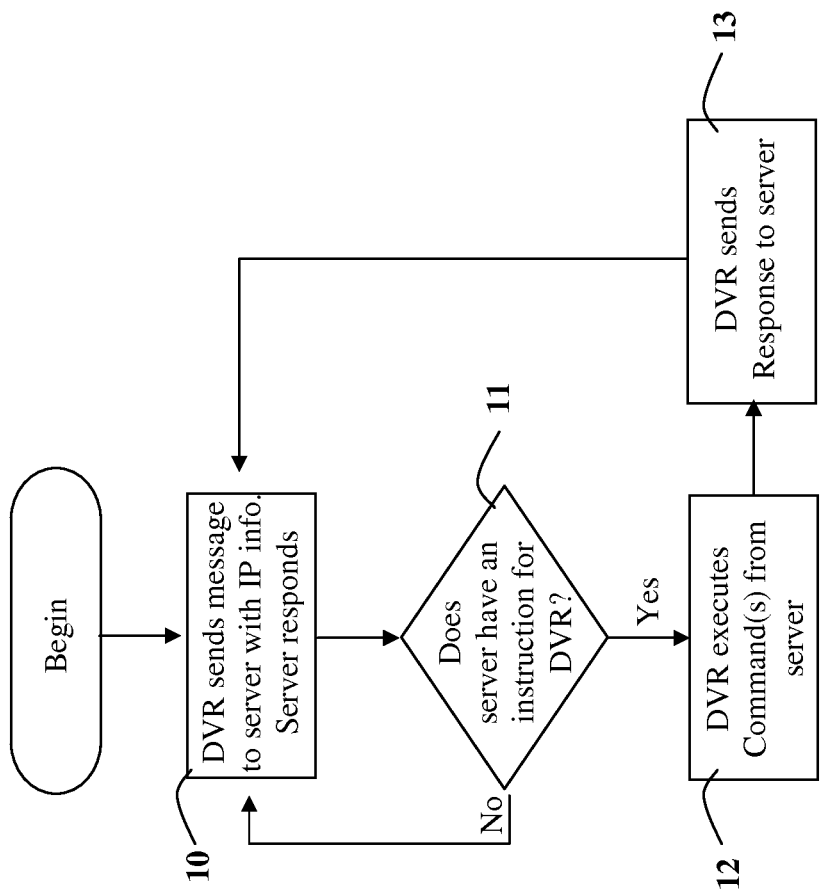
FIG. 2 is a flowchart detailing the ongoing communications between DVR(s) and central server.

FIG. 2 is a flowchart representing normal (non-alarm) communication between server 1 and DVRs 2 and 8. There can be an unlimited number of DVRs of various makes and models connected via a network medium to the server. The DVRs communicate with the server on a continuous basis. Data packets are sent using a network medium 5 via the http protocol, https protocol or other network protocol from the DVRs to the server 1. These packets are sent on a regular interval from the DVRs to the server. This allows communication with the DVRs from behind a firewall, as the DVRs are initiating the communication, requiring no special ports be opened on the router or firewall device attached to the DVRs. The packets sent from the DVRs to the server contain information such as the health status of the DVR as well as the publicly accessible IP address (step 10). If the server has successfully authenticated the DVR's authorization to communicate with the server, the server receives these packets and processes them accordingly (step 11). If the server has no instructions for the DVRs, the server returns a packet acknowledging the receipt of data from the DVR. If the server has instructions for either a specific DVR or all DVRs globally, those instructions are sent along with the packet receipt acknowledgement back to the DVRs. The IP addresses are preferably the public Internet addresses of the DVRs. Health status messages consist of the status of various hardware and software components on the DVR's. These Health Status Messages can consist of a variety of items that include, but are not limited to: available hard disk space, CPU temperature, CPU usage, video lost on a DVR's input camera channels, and the like. The server 1 also stores specific data about the connected DVR 2. This information includes, but is not limited to, the IP address of the DVRs, the username and password to connect to the DVRs and the DVR's native interface, the external ports that the DVRs use to communicate over the network medium, and the available features of the remote DVRs.

For example, if server 1 has an instruction for DVR 8 to carry out, the instruction is contained in the packet returned to DVR 8. The DVR 8 processes the command (step 12) and returns the result of the command (step 13) to the server 1. These commands include, but are not limited to, rebooting the DVR 8 unit, instructing the unit to begin capturing video clips, instructing the unit to upload the video clips to server, activating onboard relay switches on the remote DVR 8, causing the DVR 8 to go into alarm mode, instructing the DVR 8 to make a modification to its preprogrammed workflow or settings and the like. The DVR's are constantly recording video or video images from predefined, attached cameras. This video may be stored either locally, such as on the DVR, or remotely, such as on an external device. Each DVR is monitoring for abnormalities within its assigned environment via an input device or from analysis of the DVRs' incoming audio or video stream. The input device consists of a hard-wired or wireless input or a data connection to another device such as an alarm panel or panic button. Video/audio stream analysis consists of either a) motion and/or sound detected during an assigned time where no motion or sound should occur; or b) any other kind of video or audio analysis that detects an abnormality in the video or audio input streams. If a DVR detects input from the external device or video analysis indicates an abnormality in the video or audio stream, software running on the DVR generates an alarm condition.

Figure 3:
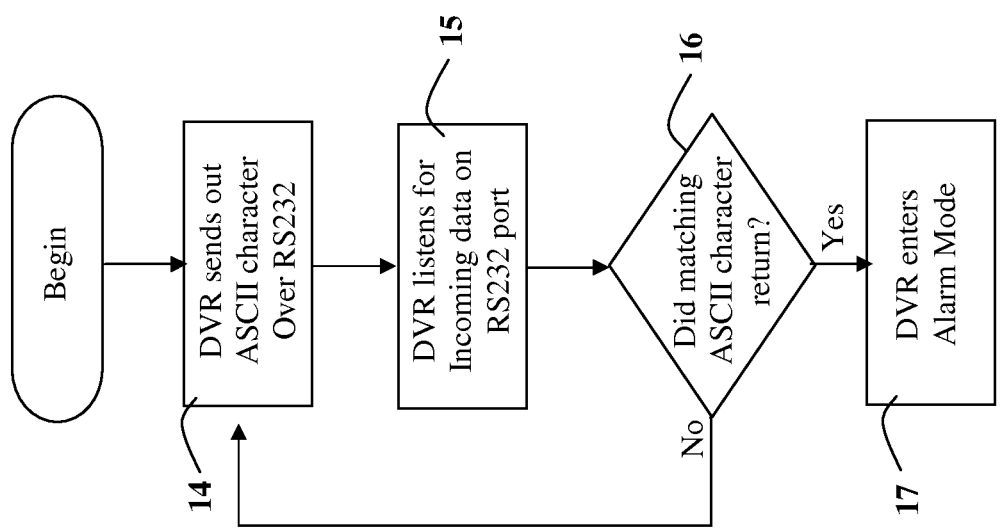
FIG. 3 is a flowchart showing the process flow for alarm monitoring using an RS232 port connected to a normally-open device output or relay.

FIG. 3 is a flowchart outlining the process flow for the DVR's monitoring of a single, closed contact hard-wired connection. For example, a DVR with an RS232 port is hard wired using the send and receive pins of the RS232 port to a normally-open switch or relay. The DVR outputs some ASCII data (step 14) though the RS232 send pin. At the same time, the DVR is listening to the receive pin on the same RS232 port (step 15). If no data returns, the DVR repeats step 14. If the ASCII data is received, it is compared against the sent data in step 14 (step 16). If the data doesn't match, the DVR repeats step 14. If the incoming data does match that sent in step 14, the DVR then enters "Alarm Mode" (step 17). Software on the DVR can also monitor other data streams including but not limited to: RS232 data streams from alarm panels and other equipment network connected input devices such as Ethernet relay/input boards as a means for the software to put DVR into alarm mode.

Figure 4:
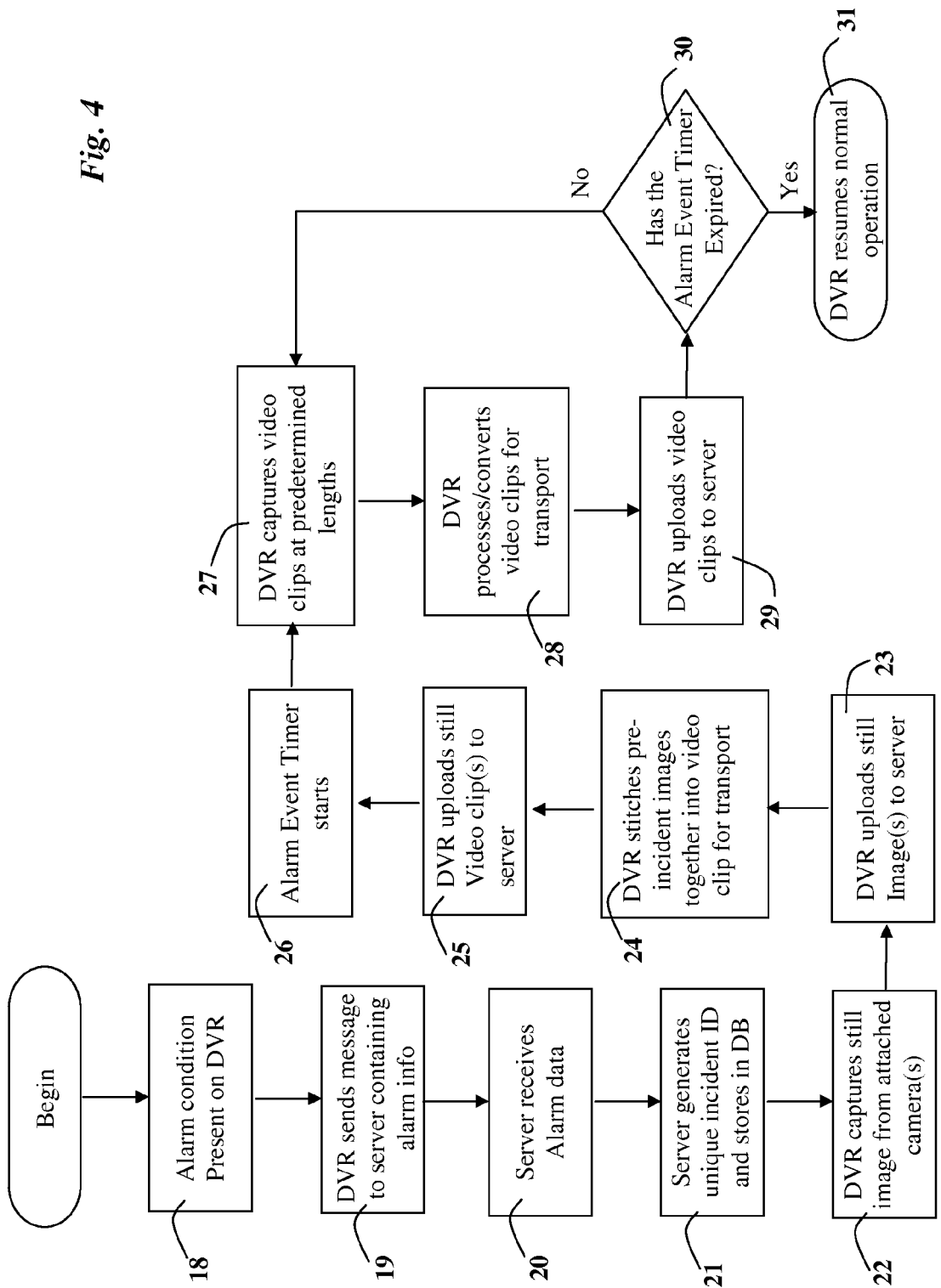
FIG. 4 is a flowchart showing the process of server/DVR communication when DVR encounters an alarm condition.

FIG. 4 depicts the flowchart of operations between a DVR and server during an alarm condition. In this instance we will use DVR 7 as the DVR connected to the system that enters alarm mode. In this instance also, secondary software capable of executing the methods described as follows preferably resides on the DVR, in addition to the DVR software itself, to carry out these tasks, although the software may alternatively or additionally reside on the server. Additionally or alternatively, because the software can be housed on all the DVRs, DVRs in the vicinity can be co-ordinated to execute the software tasks through mesh computing. This software can be integrated with all Linux and PC-based DVR's, as well as DVRs with other operating systems. It is also important to point out that this process can also be accomplished by a secondary computer or computing device located on the same IP network as the DVR or other DVRs on the same network. This allows the process flow described in FIG. 4 to operate separately from the server, without having access to the filesystem or code on the DVR itself.

When an alarm condition (step 18) occurs on the DVR, the DVR immediately sends a message (step 19) to the server which the server stores in an internal database (step 21). The message contains the DVR's unique identifier, alarm condition and alarm data. The server uses this information to generate a unique incident ID containing the alarm information sent by DVR. This incident ID is hereon used to manage further communications between DVR (2,8), Server (1) and Remote Viewer(s) (3,7). Next, the DVR captures a snapshot or still image (step 22) from attached camera(s) and uploads those image(s) to server for storage (step 23). The DVR takes video recorded prior to the alarm condition stored on the DVR or in a remote location, processes the video image(s)(step 24) and uploads them (step 25) to the server or local DVRs or computers. Processing of the video image(s) can consist of a) joining individual still images together to create a video file; or b) converting a recorded video file on the DVR to a format more suitable for transmission and display over a network medium.

The purpose of the processing taking place at the DVR, rather than the server itself, is both to a) save the server from having to process a great deal of image data—thus saving server CPU overhead; and b) creating a file size and type optimized for both speed of transport over the network medium and display on either the remote viewer or a variety of other remote devices. An example of this would be taking video from a DVR, whose video would usually require a specific piece of software from the DVR manufacturer to view remotely, converting the video to flv (flash) or another popular video format for display on a remote computer or computing device without requiring the installation of custom software from each DVR manufacturer on the remote playback devices.

After the upload of the initial, pre-recorded video from DVR begins, an "Alarm Event Timer" (step 26) starts. The Alarm event timer is a programmable increment instructing the DVR to capture clips for a designated period of time and upload them to the server and/or local DVRs. The DVR starts recording live video and/or audio (step 27) from the location, in predefined time increments. A predefined increment may be 5, 10, 15 seconds or any other increment of time. When the predetermined video clip length has been reached, the DVR then processes either recorded live video or a series of still images into a format suitable for transport over the network medium (step 28). The DVR then uploads the clip(s) to the server (step 29) and/or local DVRs who distribute it through the local mesh network. The DVR then checks to see whether or not the alarm event timer has expired (step 30). If it has not expired, the DVR repeats the process starting from step 27. If the alarm event timer has expired, the DVR returns to normal, non-alarm operation (step 31). For example, upon an alarm condition, the DVR may begin recording and uploading clips that are each 10 seconds in length, for a period of 2 minutes after the alarm condition occurred. After the alarm period has expired, the DVR reverts back to normal operation.

One of the methods the invention uses for the capturing of pre-alarm video is to "buffer" still images. On the DVR, or on an external device or server, a series of still images are captured from assigned cameras at a specific period of time i.e. one image captured every 0.5, 1, 1.5 seconds and so on. This periodic capture is defined as the capture rate. These still images are stored for a predetermined period of time. For instance, if the desired pre-alarm video clip length is 10 seconds, and the pre-alarm capture rate 0.5 seconds, the DVR or software would keep a total of 20 still images before the older image gets over-written. In the event of an alarm condition, these images are arranged in chronological older (oldest first) and are stitched together creating a video file of those captured still images. The advantage of this process is the complete and total control over the video buffering process regardless of the manufacturer of the DVR, and the DVR's own software workflow. For Example—a DVR's native software may not allow for the adjustment of frame rate or image resolution. This can create a potential problem as the speed of the network medium at the DVR location can vary greatly. Software residing on the DVR or remotely on a server or workstation will allow the modification of frame rate and quality to optimize for transport over network mediums of various speed and capacity. Once an alarm condition has occurred, the operator at a central monitoring facility has the ability to "push" the alarm and related videos to the emergency response personnel or agency responsible for emergencies, for example but not limited to local law enforcement agency, municipal emergency/911 center, fire and rescue, border patrol, government official security, homeland security, military security, and combinations thereof, responsible for the area where the alarm originated. Connection data and contact information for the local law enforcement agency is stored on the server in a database. Alarms are sent to the law enforcement agency using SMTP (email), an XML connection or whatever other method is appropriate for the configuration of the law enforcement agency's dispatch center. This allows the law enforcement agencies to actively view or assess a situation before first responders arrive on the scene. This is also what allows the law enforcement agents to view both pre-recorded and live video of an incident to which they are responding.

Software running on the remote viewer also maintains continuous communications with the server via data packets sent over HTTP, HTTPS or some other protocol. Within those data packets are unique identifiers authorizing the remote viewer to interact with specific DVR(s), access data from the server about specific DVR(s), and authentication to indicate the remote viewer is allowed to interact with the server in the first place. Authentication between the remote viewer and the server can consist of: a) username/password authentication, b) Filtering access to the server based on the IP address of the remote viewer; or c) any other appropriate method of providing a secure, authenticated connection between a remote viewer and a server. The remote viewer can consist of a stand-alone or integrated application, or may be a web page accessible through an Internet browser. Once authenticated with the server, the remote viewer has either on-demand access or alarm access to specific DVR units assigned to the authenticated remote viewer user. On-demand access is defined as the ability of remote viewer to access specific DVRs without an alarm condition being present. Alarm access is defined as a remote viewer being able to access specific DVRs in the event the DVR or another remote viewer has put the DVR in an alarm condition.

Figure 5:
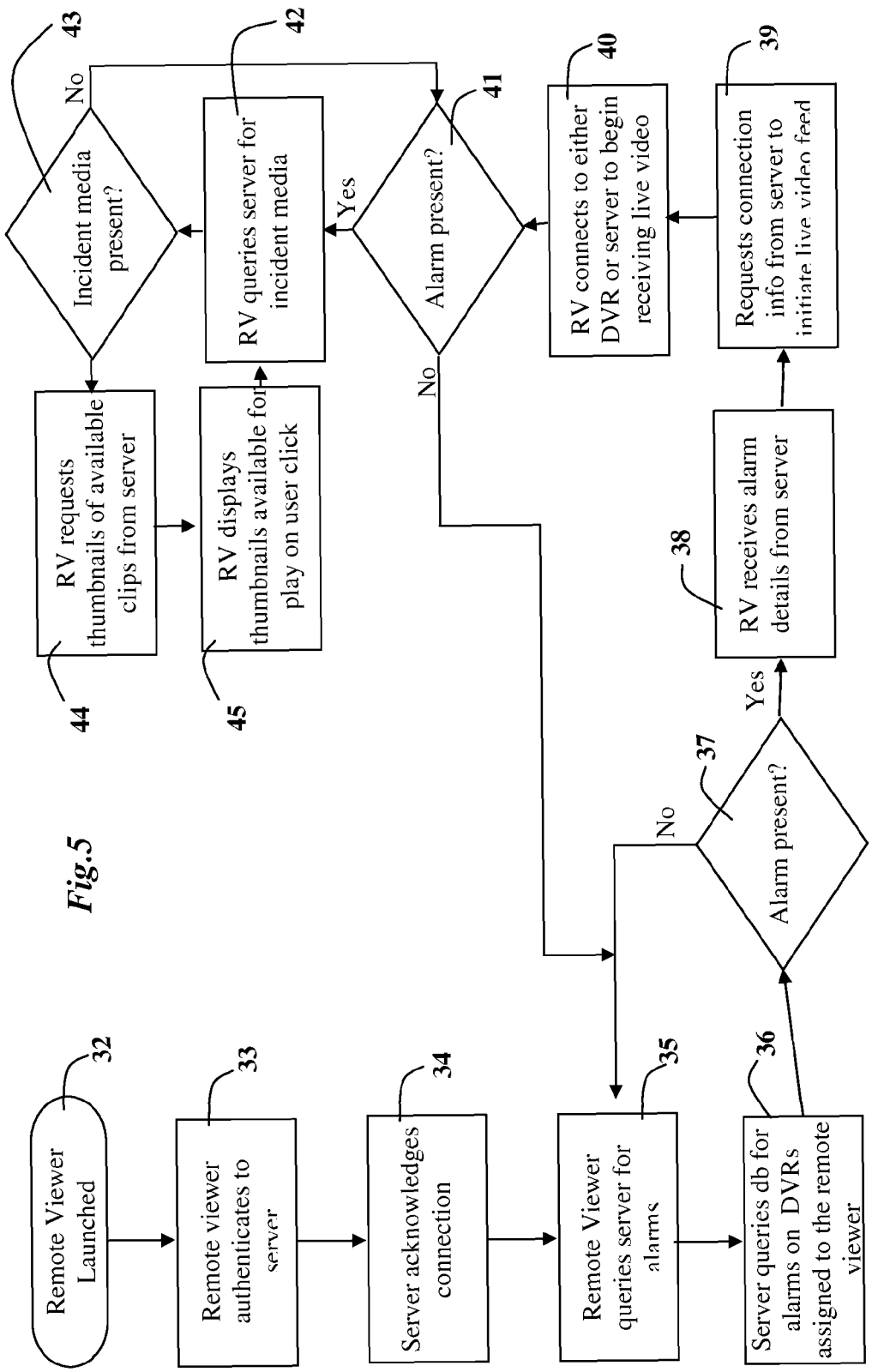
FIG. 5 is a flowchart detailing the communications between remote viewer(s) and central server during an alarm condition and during a non-alarm condition.

FIG. 5 represents a flowchart showing an interaction between a Remote Viewer (RV) and the server. This only represents one way in which the RV interacts with the server and DVR. This example uses a web browser as the remote viewer. The user launches the remote viewer (step 32). Once launched, the remote viewer authenticates to the server (step 33) and the server acknowledges the connection (step 34). The remote viewer then begins querying the server for alarms (step 35). The connection to the server for these constant requests is accomplished in a multiplicity of ways including, but not limited to, AJAX (Asynchronous JavaScript and XML) calls to the server. The server searches its database for any active alarms on any DVRs assigned to this authenticated remote viewer (steps 36, 37). If an alarm is present, the RV receives the alarm details from the server (step 38). These details include, but are not limited to: Location of alarm, IP address of DVR, contact information of location owner, and the like. The RV then requests a connection from the server to begin receiving a live video feed (step 39). DVR type and capabilities are stored in the server database. Depending on the type of DVR, the server returns code to allow connection either directly to the DVR, or to the server itself (step 40). If the connection is to be made through the server, the server then connects to the DVR, captures a video stream, and converts it to a format viewable by remote viewer. The RV then queries the server to see if the alarm is still present (step 41)

and if so, the RV requests any incident media from the server (step 43). Incident media includes, but is not limited to: Still Images, Video Files, Links, Audio files, and the like. If no incident media is present, RV goes into a loop constantly checking if the alarm is present and checking for new media (returns to step 41). If incident media is present, the RV requests thumbnails of the incident media from server (step 44). The RV receives the data from server and displays incident media thumbnails in the RV (step 45). The user can then click on the thumbnails to begin viewing the incident media which is hosted on the server. The RV then repeats the request from the server for new media (step 42), and enters the media search loop until the alarm condition on the DVR is no longer present.

There are multiple types of Remote Viewers (RVs). One such RV is a web-based interface optimized for alarm monitoring facilities for the purposes of video verification. Another such interface is a web-based or integrated application designed for view and interaction within law enforcement patrol vehicles. The patrol vehicle version incorporates larger buttons and a workflow designed to be used by a touchscreen pc. Another such viewer is one that resides on a mobile computing device such as a smartphone. This allows interaction with incident media and live video/audio by personnel on foot in the field.

The invention also incorporates image editing and cropping tools. If a person of interest is found within a piece of incident media, the RV user has the ability to take a snapshot of a particular frame of that incident media. This is accomplished by the RV passing back the timecode or current play time of the video clip back to the server. The server, as it is storing the incident media, uses software to capture a still image from within that particular video clip. The server then passes the still image back to the RV while simultaneously storing the image on the server. The user of the RV has the option to either add the still image to the incident media pool, or crop the image for highlighting a region of interest within the still image. If cropping is desired, the user selects an area of the image containing the region of interest, and those coordinates are passed back to the server. The server then takes these coordinates and uses software to crop the image stored above to that region of interest. The server then saves this cropped image and passes it on to the RV. The user then has the option to add this cropped image to the incident media pool or discard the image and return to normal RV operation.

The invention also incorporates the use of facial detection technology. This allows the automation of defining and capturing faces that are visible in incident media or live video feeds. Once a face is detected, a snapshot of the face is cropped and added to the incident media pool. This streamlines the process of searching for persons of interest within video feeds and files when an alarm occurs.

All images handled by the server are archived either for a set period of time or in perpetuity. A regular logging and backup process ensures images and data related to an alarm condition are made available in the future. This creates an "Audit Trail" allowing for specific information including, but not limited to: time the alarm was generated, user that responded to the alarm, video images seen by the operator, video images viewed by law enforcement, and the like. This audit trail and archived video will be useful for prosecution of suspects should the archived footage be needed. This preserves the chain of custody required to utilize video evidence in a court of law.

DVR owners also have the ability to make specific cameras attached to their DVRs available for viewing by law enforcement on-demand, without an alarm condition present on the DVR itself. This allows law enforcement to view these select cameras in the course of investigating another event in the vicinity of the DVR location. The vicinity of the DVR is represented on a graphical map on a computer display allowing law enforcement agencies quick access to available cameras in the area of an incident. Graphical map consists of either a Google, Bing, or other map that allows the placement of specific geolocation points on the map itself. The cameras available to law enforcement including all relevant connection data, such as by way of example and not limitation, IP addresses, usernames, and passwords, to the cameras will be stored on a server in a database.

For example, as shown in FIG. 1, DVR 8 goes into alarm mode. Video from DVR 8 is viewed on a law enforcement dispatch center's Remote Viewer. Video viewed from DVR shows suspect vehicle make and color. The dispatch center and/or emergency responders are presented with a graphical map showing available secondary DVRs 2 in the vicinity that have been made available to law enforcement. Live video from cameras from these secondary DVRs 2 are either automatically displayed on the operator's screen or the operator clicks a graphical icon to initiate the live feed on his/her screen. The secondary DVRs 2 might be connected to an external camera with a view of the street. The dispatch and/or emergency responders could use the view from secondary DVRs 2 to assist in tracking the location of suspect vehicle captured by DVR 8.

In the event of an alarm event where a DVR captures an image of a suspect vehicle, other DVRs in the vicinity are placed in an alert mode either automatically or at the operator/user's instruction to be on the lookout for an object fitting the description of the suspect vehicle. The image of the suspect vehicle is stored on the server 1 or sent to the DVR units made available for use by law enforcement. Software on the DVR or on the Server analyzes live video images for objects matching the image of the suspect vehicle. The matching is accomplished using an object tracking application. Upon the identification of an object meeting the description of the suspect vehicle by the software on DVR or server, the image is automatically presented to operator on his/her screen along with the location information of the DVR that captured the suspect vehicle. Additionally, other existing cameras, such as municipal cameras, may be included in this object tracking search as well by sending images to the server for processing.

Furthermore, the DVRs in the vicinity and in the network may proactively broadcast video clips of the suspect(s) to law enforcement personnel and the like, thus alerting them to the fact that an alarm condition has occurred and simultaneously providing them with identifying information. The video clips can be received and retransmitted by DVRs in the vicinity but not on the network, thus creating a larger alarm network without requiring normal network communication.

In the event of a capture of the facial details of a person of interest, an operator of the server initiates a facial recognition search looking for the person of interest on DVRs and cameras in the vicinity of the alarm. The facial recognition software is located on the server or the DVR units themselves. Software on the DVR or server analyzes video images for objects that match that of a human face. A still image of the person of interest is uploaded to the server, where software extracts the specific data from the facial image to initiate recognition. DVRs in the vicinity of the alarm location either begin transmitting still images from cameras that are capable of capturing images of individuals, or the server begins remotely pulling images from the DVRs to begin searching for a facial recognition match. Facial data points are extracted from these uploaded/downloaded images and compared against the data points from the original image capture of the suspect. If a match is found within a margin of error, the newly captured image appears on the operator's/User's screen along with the DVR location data where the suspect was identified.

For example, Suspect commits a crime in a retail location A. Clerk at retail location A triggers alarm and DVR enters alarm mode. A camera or cameras in retail location A capture an image of the suspect in which facial data points can be extracted. This image is uploaded to the server. Additionally or alternatively, the image is distributed to other DVRs in the network. Law enforcement is made aware of the alarm and live/recorded video is displayed on the operator/user's screen. An image is captured of the suspect's face and is presented to the operator/user on their remote viewer. Operator/user is also made aware of the availability of a facial recognition search of DVRs in the vicinity of the alarm and either commences a facial recognition search, or the facial recognition search is initiated automatically by server or remote viewer. Server begins receiving or requesting images from DVRs in the vicinity and processing for facial data. A block away, an image is captured of an individual in another retail establishment—retail establishment B. This image is processed by the facial recognition software on server, and it is found to be a 90% match to suspect wanted in connection with incident at retail establishment A. The captured image from retail establishment B is displayed on the remote viewer of operator/user along with the location details of retail establishment B. Operator/user is then able to dispatch the appropriate response to retail establishment B to apprehend suspect.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

What is claimed is:

1. A method for providing surveillance video to responders, the method steps comprising: a. providing a surveillance system, the system including at least one remote viewer running on a computer and a multiplicity of different format DVRs creating multiple video types for providing surveillance to a surveillance area, a storage device for storing video, and at least one central server; the remote viewer, DVRs, storage device and server connected via a network; b. capturing surveillance video from a surveillance area; c. converting the surveillance video to a format suitable for display on a multiplicity of different remote viewers and for transport over a network media and storing it on the storage device; d. providing access to the converted surveillance video to the responders through the at least one remote viewer.

2. The method of claim 1, wherein the surveillance video is automatically converted to the video format by the DVR.

3. The method of claim 1, wherein the surveillance video is automatically converted to the video format by the remote server.

4. The method of claim 1, wherein the format suitable for transport over a network media is an Internet browser video format.

5. The method of claim 1, wherein the secure network-based access is provided from the DVR.

6. The method of claim 1, wherein the secure network-based access is provided from the remote server.

7. The method of claim 1, wherein the video is provided wirelessly.

8. The method of claim 7, wherein the video is provided wirelessly from the DVR.

9. The method of claim 1, wherein the processing of video images consists of joining individual still images together to create a video file.

10. The method of claim 1, further including an Alarm Event Timer that is a programmable increment instructing the DVR to capture clips for a designated period of time and upload them to the server.

11. The method of claim 1, further including the step of capturing pre-alarm video by buffering still images.

12. The method of claim 1, wherein the processing of video images includes image cropping.

13. The method of claim 1, further including graphical mapping of the broadcasting DVRs in the vicinity of the alarm DVR.

14. The method of claim 1, further including using facial recognition capabilities located on the DVRs.

15. The method of claim 1, further including image editing for image clarification.

16. The method of claim 15, wherein the image editing includes image cropping.

17. The method of claim 1, further including on-demand requesting for immediate viewing of converted surveillance video by responders and by third parties.

18. The method of claim 1, wherein the video processing includes interval counting.

19. The method of claim 1, further providing access by volunteers or other local personnel to pull images and video for community policing.

20. The method of claim 1, further including multiple object detection.

21. The method of claim 1, wherein the DVR is part of a mesh network and the video processing is performed by the mesh network.

22. The method of claim 1, wherein the DVR is part of a mesh network and the converted surveillance video is distributed to the mesh network and made available to responders.

23. A method for providing surveillance video to responders, the method steps comprising: a. providing a surveillance system, the system including at least one remote viewer and a multiplicity of different format video appliances creating multiple video types for providing surveillance to a surveillance area, a video storage device and at least one central server; the viewer, video appliance and server connected via a network; b. capturing surveillance video from a surveillance area; c. converting the surveillance video to format suitable for display on a multiplicity of different remote viewers and for transport over a network media and storing it on the storage device; d. providing wireless access to the converted surveillance video to the responders through the at least one remote viewer.

24. A method for providing surveillance video to responders, the method steps comprising: a. providing a surveillance system, the system including at least two DVRs of different format in a mesh network and at least one remote viewer for providing surveillance to a surveillance area, and a video storage device; the viewer and DVRs connected via a network; b. at least one DVR capturing surveillance video from a surveillance area; c. the mesh network converting the surveillance video to format suitable for display on a multiplicity of different remote viewers and for transport over a network media and storing it on the storage device; d. the mesh network providing wireless access to the converted surveillance video to the responders through the at least one remote viewer.

\* \* \* \* \*